United States Patent
Doege

(10) Patent No.: US 10,700,399 B2
(45) Date of Patent: Jun. 30, 2020

(54) BATTERY INCLUDING THERMAL INSULATION

(71) Applicant: Robert Bosch GmbH, Stuttgart (DE)

(72) Inventor: Volker Doege, Dischingen (DE)

(73) Assignee: Robert Bosch GmbH, Stuttgart (DE)

( * ) Notice: Subject to any disclaimer, the term of this patent is extended or adjusted under 35 U.S.C. 154(b) by 229 days.

(21) Appl. No.: 15/535,918

(22) PCT Filed: Dec. 28, 2015

(86) PCT No.: PCT/EP2015/081261
§ 371 (c)(1),
(2) Date: Jun. 14, 2017

(87) PCT Pub. No.: WO2016/113102
PCT Pub. Date: Jul. 21, 2016

(65) Prior Publication Data
US 2018/0358668 A1 Dec. 13, 2018

(30) Foreign Application Priority Data
Jan. 14, 2015 (DE) .......................... 10 2015 200 390

(51) Int. Cl.
*H01M 10/658* (2014.01)
*H01M 2/10* (2006.01)
(Continued)

(52) U.S. Cl.
CPC ....... *H01M 10/658* (2015.04); *H01M 2/1077* (2013.01); *H01M 2/1088* (2013.01);
(Continued)

(58) Field of Classification Search
None
See application file for complete search history.

(56) References Cited

U.S. PATENT DOCUMENTS

| | | | |
|---|---|---|---|
| 2010/0104927 A1* | 4/2010 | Albright | H01M 2/0242 429/50 |
| 2013/0130078 A1* | 5/2013 | Schaefer | H01M 2/1016 429/72 |

(Continued)

FOREIGN PATENT DOCUMENTS

| | | |
|---|---|---|
| DE | 10216906 A1 | 11/2003 |
| DE | 102012223054 A1 | 6/2013 |

(Continued)

OTHER PUBLICATIONS

International Search Report dated Jun. 29, 2016, of the corresponding International Application PCT/EP2015/081261 filed Dec. 28, 2016.

*Primary Examiner* — Jeremiah R Smith
(74) *Attorney, Agent, or Firm* — Norton Rose Fulbright US LLP; Gerard Messina

(57) ABSTRACT

A battery, in particular a vehicle battery for a vehicle which is at least electrically drivable, including a battery housing, and at least one first battery module, the first battery module including at least one battery cell, and including at least one battery terminal for connecting the battery to a vehicle. The battery includes at least one second battery module, including at least one battery cell, inside the battery housing, the second battery module being connectable to the first battery module and energy being thereby transmitted between the battery modules, at least one thermal insulation element at least largely surrounding the first battery module, whereby the first battery module is thermally insulated and thermally separated from the second battery module.

5 Claims, 1 Drawing Sheet

(51) Int. Cl.
*H01M 10/39* (2006.01)
*H01M 10/625* (2014.01)
*H01M 10/615* (2014.01)
*H01M 10/6571* (2014.01)
*H01M 10/0565* (2010.01)
*H01M 2/02* (2006.01)
*H01M 10/613* (2014.01)

(52) U.S. Cl.
CPC ......... *H01M 2/1094* (2013.01); *H01M 10/39* (2013.01); *H01M 10/615* (2015.04); *H01M 10/625* (2015.04); *H01M 10/6571* (2015.04); *H01M 2/0242* (2013.01); *H01M 2/0245* (2013.01); *H01M 2/1016* (2013.01); *H01M 10/0565* (2013.01); *H01M 10/613* (2015.04); *H01M 2220/20* (2013.01)

(56) References Cited

U.S. PATENT DOCUMENTS

| | | |
|---|---|---|
| 2013/0207617 A1 | 8/2013 | Houchin-Miller et al. |
| 2014/0193685 A1 | 7/2014 | Lim |

FOREIGN PATENT DOCUMENTS

| | | |
|---|---|---|
| DE | 102012018905 A1 | 3/2014 |
| DE | 112012004461 T5 | 7/2014 |
| EP | 0880190 A2 | 11/1998 |
| JP | H1040952 | 2/1998 |

\* cited by examiner

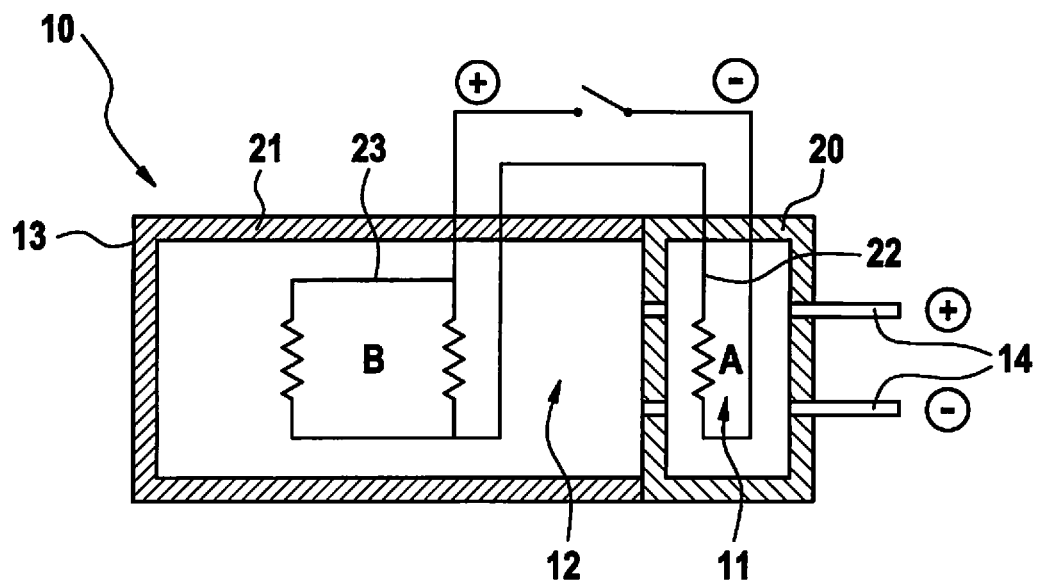

BATTERY INCLUDING THERMAL INSULATION

FIELD

The present invention relates to a battery, in particular a vehicle battery for a vehicle which is at least electrically drivable, and to a method for the thermal management of battery modules of a battery.

BACKGROUND INFORMATION

A trend which has been observed in the development of new electrochemical accumulator systems are battery concepts in which the batteries are operated at higher temperatures above room temperature. Advantages of such battery concepts as compared to lithium-ion batteries, for example, relate primarily to the increased safety, the lower costs, and an increased energy density as compared to conventional lithium-ion batteries. Background for the elevated temperature level is the possibility for providing an at least sufficiently high conductivity of the components involved (e.g., electrolyte, protective layers) and for implementing sufficiently high exchange current densities in combination with the electrochemical cell reactions involved. Such battery concepts may need to be heated during operation or during start-up, but they potentially require no cooling capacity or only very little cooling capacity for this purpose during operation.

Such battery concepts generally also require a cooling concept, since heat is generated during operation, which may lie above the thermal losses in the system, and specific temperature limits of the cells must generally also be observed. Depending on the temperature level and operating mode, a more or less complex thermal insulation of the battery cells is required in order to keep the thermal losses low and to keep the required heat output preferably low. In this case, connection lines, mechanical supports, and other thermal bridges as well as the radiation losses which are present are potential and undesirable heat leaks. These thermal power losses negatively affect the battery performance and self-discharge, which usually must be rectified with the aid of supplied energy.

During downtimes of these battery concepts without operation or only with limited operation (e.g., a parking vehicle), heating is always required in order to be prepared for the further operation of the battery in the range of the optimal working temperature. This costs energy and may discharge the battery. There is also the possibility, during downtimes, for allowing the battery to cool down and to be heated back up to the optimal operating temperature before the next start-up. A battery which has cooled down, i.e., which is at room temperature, is mostly incapable of heating itself up, since the kinetics of the cell reaction and the internal power processes are still too limited.

German Patent Application No. DE 10 2012 223 054 A1 describes one possibility for the thermal management of a vehicle battery, in which the conditioning of the operating temperature of the battery takes place during the vehicle operation. The adaptation of the operating temperature range during operation or while the battery is connected to the charging device and to the current source is used in this case for preconditioning as a function of the ambient temperature. The disadvantage of the conventional approaches is the absence of the possibility for holding the battery at operating temperature during standing phases and for thereby dispensing with an external energy source for the thermal activation of the battery. The related art therefore lacks an approach for the energy-saving thermal management or thermal activation of the battery, the self-sufficiency of the batteries, in particular, being increased and, therefore, longer standing phases of the vehicles being made possible.

SUMMARY

An object of the present invention is to at least partially eliminate the above-described disadvantages. In particular, the object of the present invention is to greatly reduce the energy losses during downtimes of the battery and, therefore, to increase the self-sufficiency of the battery in a cost-effective and energy-saving way. Within the scope of the present invention, "self-sufficiency of the battery" is to be understood to mean a type of thermal insulation system for the thermal management of the battery. In this case, the battery does not require a connection to the grid, but rather utilizes the available energy of the battery for the thermal management, so that the battery is brought to the optimal operating temperature or is held there.

The above-described object may be achieved by a battery and by a method for the thermal management of a battery in accordance with the present invention. Further features and details of the present invention are described herein. In this case, features and details which are described in conjunction with the battery also apply, of course, in conjunction with the method according to the present invention and vice versa in each case, so that, reference is always made and may always be made either way to the individual aspects of the present invention.

According to the present invention, the battery for a vehicle which is at least electrically drivable includes a battery housing including at least one first battery module, the battery module including at least one battery cell. At least one (electrical) battery terminal for connecting the battery to a vehicle is situated on the battery. In accordance with the present invention, the battery includes at least one second battery module including at least one battery cell, the second battery module being connectable to the first battery module, whereby energy is transmittable between the battery modules. At least one thermal insulation element at least largely surrounds the first battery module in this case, whereby the first battery module is thermally insulated and thermally separated from the second battery module. Therefore, a modular and/or separate thermal management of the battery, in particular of the individual battery modules, is achievable, whereby an energy-saving thermal management of the battery is made possible. The battery modules may be differently dimensioned in this case, so that different capacitances and/or geometric sizes are present, depending on the application, in order to thermally manage the particular other battery module. In this case, the battery includes a shared housing, the battery modules being connected, in particular electrically, to each other. According to the present invention, it is also possible, however, that a thermal connection of the battery modules to each other is present, so that both electrical as well as thermal energy may be transmitted.

In accordance with the present invention, an embodiment of the battery is provided, with at least two battery modules including one shared battery housing, but with the two battery modules being thermally insulated and thermally separated from each other. Due to the embodiment according to the present invention, the thermal energy of the at least one battery module is stored in the one battery module in the best possible way by way of the thermal insulation element. In this case, the thermally insulated battery module may be arbitrarily dimensioned, a dimensioning being advantageous in which so much energy is available that the activation of the second battery module, i.e., the heating-up of the second battery module, may be ensured for the operating condition. Different thermal insulation materials are possible for an insulation element according to the present invention, common materials which are suitable for use being listed, in part, in the following. In this way, for example, a plastic insulation is possible, which may also be designed as foam in the form of artificial organic foam, such as preferably polyethylene, polystyrene, Neopor, polyurethane, or resol foam in this case. Mineral fibers, such as stone and fiber-glass wool, are also possible for a thermal insulation according to the present invention. Particularly advantageously, aerogel mats and vacuum insulation panels are suitable due to their poor thermal conductivity. In this case, a thermal insulation element according to the present invention may surround the first battery module over a portion of the surface or over the entire surface, so that a best possible thermal insulation depending on the application may be ensured. The battery or the corresponding battery modules themselves may preferably be designed to be rechargeable, in particular being designed as a high temperature battery and/or a solid-state battery.

Within the scope of the present invention, the second battery module may likewise be at least largely surrounded by a thermal insulation element, whereby the second battery module is thermally insulated and thermally separated from the first battery module. In this case, the battery modules may also be insulated individually, i.e., separately and separated from each other. A thermal insulation of the second battery module makes it possible to also store the thermal energy in the second battery module, so that thermal losses of the second battery module may be further reduced. This yields the advantage that the second battery module stores the thermal energy for a preferably long period of time during standing times of the vehicle, whereby the battery power also decreases more slowly, with the result that the thermal or electrical energy of the second battery module may be utilized for the thermal management of the first battery module. The at least first battery module is therefore held at a necessary working temperature, so that the first battery module may heat up the second battery module upon start-up of the battery. In this case, the transmission of energy (electrically, for operating the heating elements—and possibly also thermally) from the one battery module to the other battery module, in particular, is decisive for the self-sufficiency of the battery. The thermal insulation element of the second battery module may also be situated on the second battery module, specifically on a portion of the surface or on the entire surface, in this case, so that thermal insulation and thermal separation of the second battery module from the first battery module may be established. In this case as well, the same insulation materials as those used for the insulation of the first battery module are possible. As a function of the economic and vehicle-type preconditions, the thermal insulation may be designed in such a way that it ensures the economical operation of the vehicle. Consequently, costs and technical complexity with respect to the implementation may be reduced.

Furthermore, it may be advantageous when at least one battery module includes at least one heating element, whereby a thermal management of the other battery module is achievable. A heating element according to the present invention is provided instead of or in addition to the at least one thermal insulation element, so that an optimal working temperature may be established. The heating element may heat the particular battery module before, during, or after the vehicle is started. In particular, it is advantageous, however, when the at least one heating element of at least one battery module thermally manages the battery module to the working temperature during the downtime of the battery without operation or only with limited operation. If the two battery modules are each equipped with a heating element, it is possible that the battery module which was not thermally managed during the downtime is subsequently heated during the start phase of the vehicle. The one battery module therefore forms the energy source for the heating element in the other battery module during the downtime, so that these battery modules self-sufficiently supply each other with energy for the thermal management.

According to the present invention, it is possible that the heating element transmits energy electrically and/or fluidically. If the heating element is electrically supplied with energy from at least one battery module, an active electrical thermal management of the other battery module may be established. In this case, the electrical heating element may be designed, for example, as a thermal resistance, as a heating wire, or as a heating foil, but, within the scope of the present invention, is not limited to these embodiments. The electrical heating element has the advantage in this case that a particularly rapid heating-up of the battery module may be achieved, so that a rapid heating-up of the battery module which has not been thermally managed during the downphase may be established. The battery module is therefore again at working temperature during start-up, i.e., after the start phase, in a relatively short period of time, so that a possible battery power is restored. In the case of a heating element which is designed in such a way that thermal energy may be transmitted via a fluid, a passive thermal management of the battery module is made possible. In this case, the battery modules are connected to each other in such a way that the thermal energy of the one battery module which cools down during the downphase is transmitted to the other battery module and is given off there, for example, with the aid of a heat exchanger. As a result, it is made possible that the one battery module which does not cool down during the downphase does not give off any electrical energy to the other battery module, so that the state of charge of the cooled-down battery module is lower than in the case of an electrically connected heating element. A fluidically supplied heating element is a particularly energy-saving form of the thermal management of the at least one battery module.

It is likewise advantageous when the heating element is connected to a control unit, with the aid of which the heat output may be regulated and/or controlled. The control unit is ideally situated in the battery housing in this case, so that no further heat leaks may arise due to connection cables. The control unit may be mechanically and/or electrically designed in this case and, in addition, may control the heating element as a function of the ambient temperature or battery temperature. A mechanical control unit is significant, in particular, when the heating element is fluidically supplied with energy, it being possible for the control unit to be a valve or a pump. The control unit controls, on the one hand, that an optimal working temperature of the battery module is set, damage to the battery due to overheating being simultaneously avoided. In this case, the heat output may be regulated as a function of the ambient temperature, so that the amount of energy utilized for the thermal management of the battery module is neither excessive nor insufficient. It is possible that the control unit controls and/or regulates the heat output of the heating element as a function of the planned or probable downtime. Therefore, given a long downtime, the heat output may be less than is the case with a short downtime. The battery modules are therefore also again at operating temperature more quickly or slowly, a thermal management simultaneously taking place as a function of the state of charge of the battery module. Likewise, the control unit may control the heat output as a function of the dimensioning of the particular battery module and/or the dimensioning of the particular heating element. Moreover, it is possible that the control unit learns the user behavior of the battery to the extent that different parameters, such as downtimes, ambient temperatures, and time of day are recorded and evaluated by the control unit. As a result, usage profiles may be ascertained, which may learn or predict the daily routine of the battery usage and therefore may control the heat output during the downtimes accordingly. In this way, the control unit may detect, for example, whether the battery is regularly out of service for a certain period of time, during which the heating element must be thermally managed for a constant period of time.

It is likewise advantageous when the battery housing is formed at least partially by the insulation element. Consequently, the insulation element is preferably designed in this case to be integral with the battery housing, in particular being made of the same material as the battery housing. The result thereof is an at least partially integrated design formed by a housing and insulation element, whereby the thermal losses may be further reduced. As a result, the design of the battery housing which is common in the related art and is mostly made from metal may be dispensed with, and a switch may be made to plastic-based designs. In this case, further advantages also result in that the production of the battery housing may be simplified, since a simple manufacturing takes place with the aid of injection molding, for example, a subsequent application of an insulation element being dispensed with.

Within the scope of the present invention, it is possible that the insulation element is movably situated on the battery module and/or on the battery housing. In this case, a module-individual or a shared thermal insulation is possible. Within the scope of the present invention, "movably" is to be understood to mean that the insulation element is reversibly mountable, for example, with the aid of a holding element, so that the access to the battery housing and/or the battery module at any time is made possible. The insulation elements according to the present invention may have different designs in this case, which are adapted to the design of the battery module or the battery housing and the battery contacts in an optimal way. As a result, a largely optimal installation space is created, in which a thermal insulation may be implemented in combination with a simultaneously compact design and improved accessibility of the battery. The insulation elements may include holding element in this case, whereby the insulation elements are reversibly mountable on the battery module and/or on the battery housing, so that an access to at least the battery contacts during maintenance and/or repair work may be implemented. The holding element may be, for example, hook and loop fasteners, magnetic closures, or reversibly establishable adhesive bonds, as well as bolted connections, clip connections, or plug connections. In addition, the insulation elements may also include holding elements in the form of hinges or comparable flap mechanisms, so that the insulation elements may be brought out of at least one use position into a maintenance position, as necessary. As a result, the access to the battery or the battery contacts is made possible without damaging the insulation. Moreover, it is possible that the insulation elements are movable with the aid of a drive, so that these insulation elements, when utilized, may be moved away from the battery or toward the battery. As a result, it is made possible that the insulation elements may thermally insulate the battery when in the use position and may be folded away from the battery when cooling is necessary. In this way, for the case in which the battery is above the optimal working temperature, a cooling of the battery is achievable, so that damage to the battery cells or the battery modules may be largely avoided.

The battery itself may be designed as a solid-state battery and/or a high temperature battery, in particular lithium-metal-polymer batteries, i.e., LMP batteries having an operating temperature range of approximately 60° C. to 100° C., or sodium nickel chloride batteries having an operating temperature range of approximately 270° C. to 350° C., and preferably has high specific energies, preferably above 400 Wh/kg.

According to yet another aspect of the present invention, a method for the thermal management of battery modules of a battery is provided. In a method according to the present invention, the battery may be brought into an operating state in which a drive of a vehicle is supplied with electrical energy, and into a resting state in which the drive consumes no energy. It is essential in this case that energy for the thermal management is transmittable from the second battery module to the first battery module in the resting state. Therefore, an optimal working temperature of the first battery module may be set, so that, during downtimes, the required heat output for the first battery module may be supplied by the second battery module. In the resting state of the battery, available thermal or electrical energy of the second battery module is utilized in order to directly thermally manage a heating element or the battery module, electrical energy being transmitted from the second battery module to the heating element of the first battery module in the case of an electrically active thermal management and, in the case of a passive thermal management, adjustment is carried out via fluidic thermal management, for example, via a heat exchanger or a thermal conductor. Accordingly, the self-sufficiency of the battery is increased with the aid of the method according to the present invention, whereby longer downphases are made possible, the energy losses due to non-use being greatly reduced.

According to the present invention, thermal energy and/or electrical energy may be transmitted from the first battery module to the second battery module in the operating state, whereby the operating temperature in the first battery module and in the second battery module is settable. The operating state is the state in which the previously cooled-down battery module is heated with the aid of the thermally managed battery module, so that an operating temperature of the second battery module may be reset. This state may also prevail during an only limited operation (for example, a parking vehicle), so that a rapid further operation of the battery, in particular all battery modules, may be prepared. In particular, in this case, thermal and/or electrical energy is transmitted to the heating element of the second battery module, so that the operating temperature may be set in the first and in the second battery module as quickly as possible. As a result, a thermal activation of the second battery module without an external energy source is made possible, the required energy demand being largely reduced.

All advantages which have already been described with respect to the battery according to the present invention result for the described method.

BRIEF DESCRIPTION OF THE DRAWING

Further measures which improve the present invention result from the following description of one exemplary embodiment of the present invention which is schematically represented in the drawing. All features and/or advantages, including design details, spatial arrangement, and method steps, resulting from the claims, the description, or the drawing, may be essential to the invention alone or in highly diverse combinations.

FIG. 1 schematically shows a first specific embodiment of a battery according to the present invention.

DETAILED DESCRIPTION OF EXAMPLE EMBODIMENTS

FIG. 1 schematically shows a battery 10 according to the present invention, which includes a battery housing 13 in which first battery module 11 and second battery module 12 are situated. Battery contacts 14 are situated on the shared battery housing, which are used for connecting the battery to a vehicle and are connected at least to first battery module 11. Battery module 11 includes a first thermal insulation element 20 and a heating element 22. Thermal insulation element 20 surrounds battery module 11 and is designed flush with battery housing 13. Second battery module 12 likewise includes a separate thermal insulation element 21 which likewise surrounds battery module 12. First battery module 11 and second battery module 12 are electrically connected to each other in this case. The two heating elements 22 and 23 of the two battery modules 11 and 12 are likewise connected, so that electrical and/or thermal energy may be transmitted via the connection. A switch is used in this case for optionally connecting the heating elements 22 and 23 to each other, since these heating elements do not necessarily need to be connected to each other. In this case, heating element 22, 23 may be electrically and/or thermally operated by battery module 11, 12.

In the specific embodiment shown, battery modules 11, 12 are dimensioned in different sizes, so that battery modules 11 and 12 also have different capacitances. First battery module 11 is dimensioned substantially smaller than second battery module 12 in this case, with the consequence that first battery module 11 requires less heating energy than second battery module 12. First battery module 11 is dimensioned in such a way, in this case, that sufficient energy may be made available for heating second battery module 12. In the resting state, energy is therefore transmitted from second battery module 12 to heating element 22 of first battery module 11, whereby battery module 11 is held at a corresponding temperature or is heated to a temperature.

In the operating state, in turn, energy is transmitted from first battery module 11 to heating element 23 of the second battery module.

What is claimed is:

1. A battery for a vehicle, which is at least electrically drivable, comprising:
   a battery housing;
   at least one first battery module having at least one battery cell;
   at least one battery contact for connecting the battery to a vehicle; and
   at least one second battery module including at least one battery cell, inside the battery housing, the second battery module being connectable to the first battery module, wherein energy is transmittable between the battery modules;
   wherein at least one thermal insulation element surrounds the first battery module and is flush with the battery housing, and wherein the first battery module is thermally insulated and thermally separated from the second battery module,
   wherein the second battery module is surrounded by a separate thermal insulation element, and wherein the second battery module is thermally insulated and thermally separated from the first battery module,
   wherein the first battery module and the second battery module each include at least one heating element, wherein the at least one heating element of each of the first battery module and the second battery module are electrically connected, and wherein thermal management of the other one of the first and second battery modules is provided with the at least one heating element,
   wherein the at least one battery contact includes battery contacts situated on the battery housing, which is shared by the at least one first battery module and by the at least one second battery module, the battery contacts being connected at least to the first battery module, and
   wherein the battery modules are dimensioned in different sizes, so that the battery modules have different capacitances, so that a smaller one of the battery modules requires less heating energy than the other of the battery modules, wherein in a resting state, energy is transmitted from the other one of the battery modules to the heating element of the smaller one of the battery modules, and wherein in an operating state, energy is transmitted from the smaller one of the battery modules to the heating element of the other one of the battery modules.

2. The battery as recited in claim 1, wherein the at least one heating element transmits energy at least one of electrically and fluidically.

3. The battery as recited in claim 1, wherein the at least one heating element is connected to a control unit, by which the heat output may be at least one of regulated and controlled.

4. The battery as recited in claim 1, wherein the battery housing is formed at least partially by the insulation element.

5. The battery as recited in claim 1, wherein the insulation element is movably situated on at least one of the battery module and the battery housing.

* * * * *